US012766975B2

(12) United States Patent
Kitabatake

(10) Patent No.: US 12,766,975 B2
(45) Date of Patent: Oct. 20, 2026

(54) VEHICLE

(71) Applicant: TOYOTA JIDOSHA KABUSHIKI KAISHA, Toyota (JP)

(72) Inventor: Hirotatsu Kitabatake, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 18/919,438

(22) Filed: Oct. 18, 2024

(65) Prior Publication Data

US 2025/0222783 A1 Jul. 10, 2025

(30) Foreign Application Priority Data

Jan. 9, 2024 (JP) ................................ 2024-001385

(51) Int. Cl.
*B60L 15/20* (2006.01)

(52) U.S. Cl.
CPC ........... *B60L 15/20* (2013.01); *B60L 2220/42* (2013.01); *B60L 2240/425* (2013.01)

(58) Field of Classification Search
CPC ............... B60L 15/20; B60L 2240/425; B60L 2220/42; B60L 15/38; B60L 2260/44
See application file for complete search history.

(56) References Cited

U.S. PATENT DOCUMENTS

| | | | | |
|---|---|---|---|---|
| 5,453,930 | A * | 9/1995 | Imaseki | B60L 15/20 180/65.265 |
| 2009/0054200 | A1* | 2/2009 | Soliman | B60W 10/08 701/67 |
| 2017/0050536 | A1* | 2/2017 | Martin | B60K 17/356 |
| 2019/0193578 | A1* | 6/2019 | Fujiyoshi | B60L 15/2036 |
| 2021/0016659 | A1* | 1/2021 | Kono | B60K 1/02 |
| 2022/0355783 | A1* | 11/2022 | David | B60W 30/1882 |
| 2023/0087455 | A1* | 3/2023 | Manabe | B60L 15/2045 701/22 |

FOREIGN PATENT DOCUMENTS

| | | |
|---|---|---|
| JP | 2012-034433 A | 2/2012 |

* cited by examiner

*Primary Examiner* — Anne Marie Antonucci
*Assistant Examiner* — Nicholas Patrick Langhorne
(74) *Attorney, Agent, or Firm* — SoraIP, Inc.

(57) ABSTRACT

The vehicle includes a first motor that applies a driving force to the first wheel via the first speed reducer, a second motor that applies a driving force to the second wheel via the second speed reducer, and a control device that controls the driving force of the first motor and the driving force of the second motor. A maximum driving force that is outputtable by the first motor is greater than a maximum driving force that is outputtable by the second motor. When a temperature parameter correlated with a temperature of the first speed reducer and a temperature of the second speed reducer is lower than a predetermined temperature, the control device drives the second motor with priority over the first motor.

4 Claims, 6 Drawing Sheets

VEHICLE

CROSS-REFERENCE TO RELATED APPLICATION

This application claims priority to Japanese Patent Application No. 2024-001385 filed on Jan. 9, 2024, incorporated herein by reference in its entirety.

BACKGROUND

1. Technical Field

The present disclosure relates to a vehicle equipped with a plurality of motors.

2. Description of Related Art

Japanese Unexamined Patent Application Publication No. 2012-034433 (JP 2012-034433 A) relates to a vehicle including a first motor and a second motor. JP 2012-034433 A discloses technology in which, when output requested to the vehicle (requested driving force) is no more than the smaller allowable output of allowable output of the first motor and allowable output of the second motor, the motor of the first motor and the second motor of which temperature is on a low temperature side is selected and run. In this technology, when temperature difference between the first motor and the second motor does not reach a predetermined value, switching from the first motor to the second motor or switching from the second motor to the first motor is forbidden.

SUMMARY

According to the above-described technology, driving just the motor on the low-temperature side out of the first motor and the second motor enables the temperature difference between the first motor and the second motor to be reduced. However, from a perspective of energy efficiency, it is not necessarily desirable to stop the motor on the high-temperature side and to perform driving with just the motor on the low-temperature side. Further, JP 2012-034433 A makes no mention of how to control each motor when the temperature of both the first motor and the second motor is low. In a vehicle in which a motor applies a driving force to wheels via a speed reducer, when the temperature of the speed reducer becomes excessively low, energy loss tends to increase.

The present disclosure has been made in order to solve the above problems, and an object thereof is to improve energy efficiency in a vehicle equipped with a plurality of motors.

According to one aspect of the present disclosure, a vehicle having the following configuration is provided.

The vehicle includes

- a first motor that applies driving force to a first wheel via a first speed reducer,
- a second motor that applies driving force to a second wheel via a second speed reducer, and
- a control device that controls the driving force of the first motor and the driving force of the second motor.

A maximum driving force that is outputtable by the first motor is greater than a maximum driving force that is outputtable by the second motor.

When a temperature parameter correlated with a temperature of the first speed reducer and a temperature of the second speed reducer is lower than a predetermined temperature, the control device drives the second motor with priority over the first motor.

According to the present disclosure, energy efficiency can be improved in a vehicle equipped with a plurality of motors.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
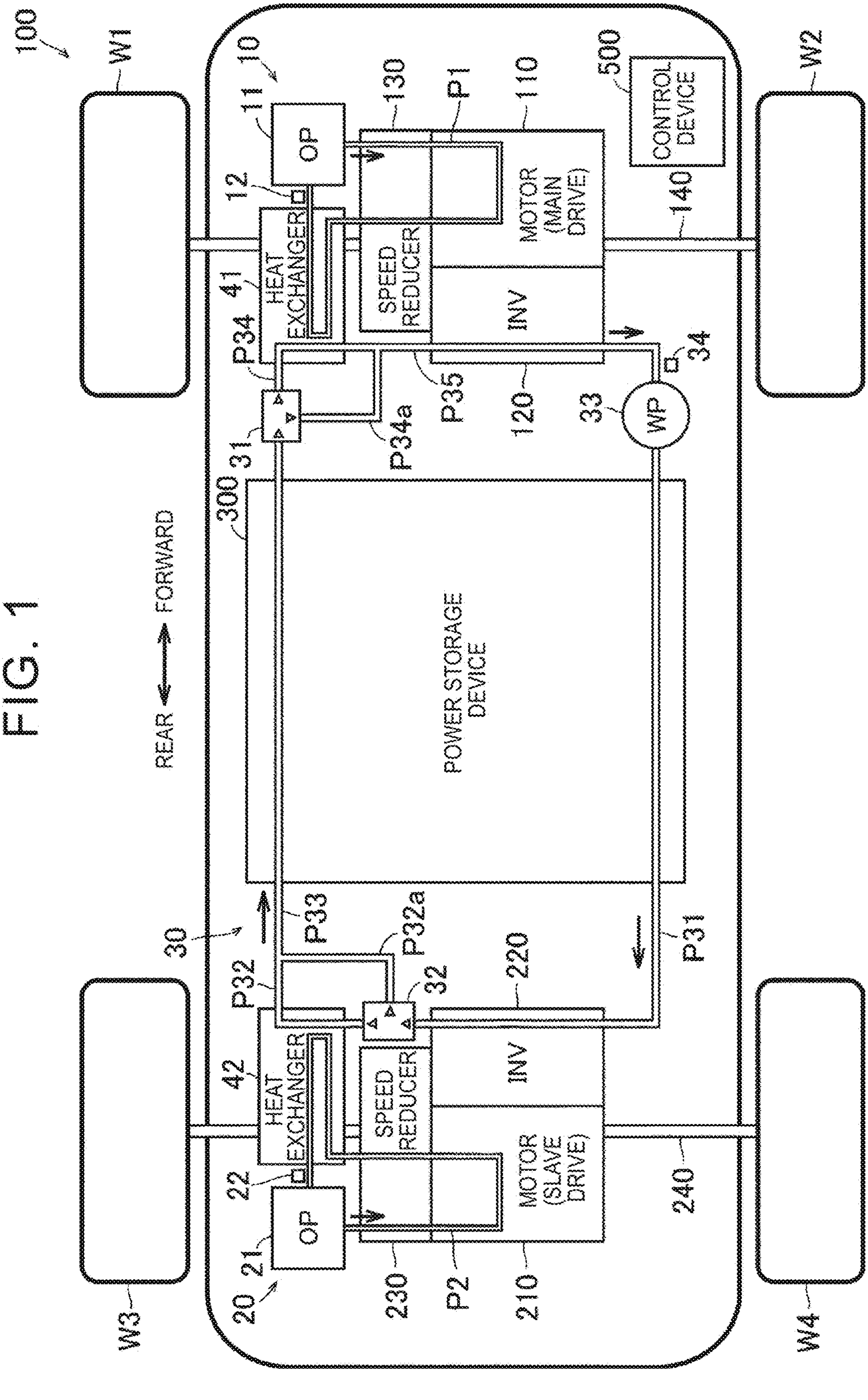
FIG. 1 is a diagram illustrating a schematic configuration of a vehicle according to an embodiment of the present disclosure.

An embodiment of the present disclosure will be described in detail with reference to the drawings. The same or corresponding parts in the drawings are designated by the same reference signs and repetitive description will be omitted.

FIG. 1 is a diagram illustrating a schematic configuration of a vehicle according to this embodiment. Referring to FIG. 1, a vehicle 100 includes motors 110, 210, inverters 120, 220, speed reducers 130, 230, axles 140, 240, a power storage device 300, lubricating devices 10 and 20, a cooling device 30, heat exchangers 41 and 42, a control device 500, and wheels W1 to W4. The cooling device 30 is configured to be able to exchange heat with each of the lubricating devices 10 and 20. The cooling device 30 is configured to cool the inverter 120,220 and the power storage device 300. The control device 500 is configured to control the inverter 120,220, the lubricating devices 10 and 20, and the cooling device 30. The vehicle 100 is, for example, a four-wheel battery electric vehicle (BEV) configured to be able to travel using electric power outputted from the power storage device 300.

The wheels W1, W2, the motor 110, the speed reducer 130, and the axle 140 are disposed at the front portion of the vehicle 100. A wheel W1 is attached to one end of the axle 140, and a wheel W2 is attached to the other end. Each of the wheels W1, W2 corresponding to the front wheels of the vehicle 100 corresponds to an exemplary "first wheel" according to the present disclosure. The motor 110, the speed reducer 130, and the axle 140 are mechanically coupled to each other. The motor 110 applies a driving force (torque) to the axle 140 (and thus the wheels W1, W2) via the speed reducer 130.

Inverter 120 serves as a power control unit (PCU) for motor 110. The inverter 120 generates drive power for the motor 110 using the power supplied from the power storage device 300. The motor 110 is driven by the inverter 120 to rotate the wheels W1, W2. The torque outputted from the motor 110 is transmitted to the axle 140 (and thus the wheels W1, W2) via the speed reducer 130.

The lubricating device 10 includes an oil circuit P1 (first oil circuit) through which the lubricating oil of the speed reducer 130 circulates, a pump 11, and a temperature sensor 12 (first temperature sensor). The pump 11 functions as an oil pump. The pump 11 is controlled by the control device 500 and circulates the lubricating oil of the speed reducer 130 to the oil circuit P1. The oil circuit P1 passes through the motor 110, the speed reducer 130, and the heat exchanger 41. The lubricating device 10 supplies lubricating oil to the motor 110 and the speed reducer 130, and cools the motor 110 and the speed reducer 130 with the lubricating oil. Such a cooling method is capable of cooling by directly passing oil through a heat generating portion, and thus has a high cooling effect. The temperature sensor 12 detects the temperature of the lubricating oil of the speed reducer 130 flowing through the oil circuit P1, and outputs the detected temperature to the control device 500.

The wheels W3, W4, the motor 210, the speed reducer 230, and the axle 240 are disposed at a rear portion of the vehicle 100. A wheel W3 is attached to one end of the axle 240, and a wheel W4 is attached to the other end. Each of the wheels W3, W4 corresponding to the rear wheels of the vehicle 100 corresponds to an exemplary "second wheel" according to the present disclosure. The motor 210, the speed reducer 230, and the axle 240 are mechanically coupled to each other. The motor 210 applies a driving force (torque) to the axle 240 (and thus the wheels W3, W4) via the speed reducer 230.

Inverter 220 serves as a power control unit (PCU) for motor 210. The inverter 220 generates drive power for the motor 210 using the power supplied from the power storage device 300. The motor 210 is driven by the inverter 220 to rotate the wheels W3, W4. The torque outputted from the motor 210 is transmitted to the axle 240 (and thus the wheels W3, W4) via the speed reducer 230.

The lubricating device 20 includes an oil circuit P2 (second oil circuit) in which the lubricating oil of the speed reducer 230 circulates, a pump 21, and a temperature sensor 22 (second temperature sensor). The pump 21 functions as an oil pump. The pump 21 is controlled by the control device 500 and circulates the lubricating oil of the speed reducer 230 to the oil circuit P2. The oil circuit P2 passes through the motor 210, the speed reducer 230, and the heat exchanger 42. The lubricating device 20 supplies lubricating oil to the motor 210 and the speed reducer 230, and cools the motor 210 and the speed reducer 230 with lubricating oil. Such a cooling method is capable of cooling by directly passing oil through a heat generating portion, and thus has a high cooling effect. The temperature sensor 22 detects the temperature of the lubricating oil of the speed reducer 230 flowing through the oil circuit P2, and outputs the detected temperature to the control device 500.

The cooling device 30 includes three-way valves 31 and 32, a pump 33, a temperature sensor 34, and passages P31, P32, P32*a*, P33, P34, P34*a*, P35 through which the refrigerant flows. The pump 33 is configured to receive the refrigerant from the passage P35 and to deliver the refrigerant to the passage P31. The coolant flowing through the passages P35, P31 exchanges heat with the inverters 120 and 220, respectively. Accordingly, the inverters 120 and 220 are cooled. The coolant flowing through each of the passages P31, P33 exchanges heat with the power storage device 300. As a result, the power storage device 300 is cooled. The temperature sensor 34 detects the temperature of the refrigerant and outputs the detection result to the control device 500. In this embodiment, water is employed as the refrigerant, and a water pump is employed as the pump 33. However, the type of the refrigerant can be changed as appropriate. The refrigerant is not limited to a liquid, and may be a gas. The cooling device 30 may be configured to be capable of adjusting the temperature of the refrigerant. The cooling device 30 may be configured to be capable of exchanging heat with a refrigeration cycle for an air conditioner, for example.

Of the three ports of the three-way valve 32, the first port (inlet) is connected to the passage P31, the second port (first outlet) is connected to the passage P32, and the third port (second outlet) is connected to the passage P32*a*. The three-way valve 32 connects one of the second port and the third port specified by the control device 500 to the first port. The passage P32 is connected to the passage P33 through the heat exchanger 42. The passage P32*a* is connected to the passage P33 without passing through the heat exchanger 42. The 25 passage P32*a* corresponds to a by-pass passage.

Of the three ports of the three-way valve 31, the first port (inlet) is connected to the passage P33, the second port (first outlet) is connected to the passage P34, and the third port (second outlet) is connected to the passage P34*a*. The three-way valve 31 connects one of the second port and the third port designated by the control device 500 to the first port. The passage P34 is connected to the passage P35 through the heat exchanger 41. The passage P34*a* is connected to the passage P35 without passing through the heat exchanger 41. The passage P34*a* corresponds to a by-pass passage.

In this embodiment, the maximum driving force that the motor 110 outputtable is greater than the maximum driving force that the motor 210 outputtable. The motor 110 and the motor 210 function as a main drive motor (first motor) and a slave drive motor (second motor), respectively. The sensitivity of the loss to the rotational speed is smaller for the motor 210 than for the motor 110. The control device 500 controls the driving force of the motor 110 and the driving force of the motor 210. The control device 500 can individually change the output of the motors 110, 210 by the inverters 120, 220.

Figure 2:
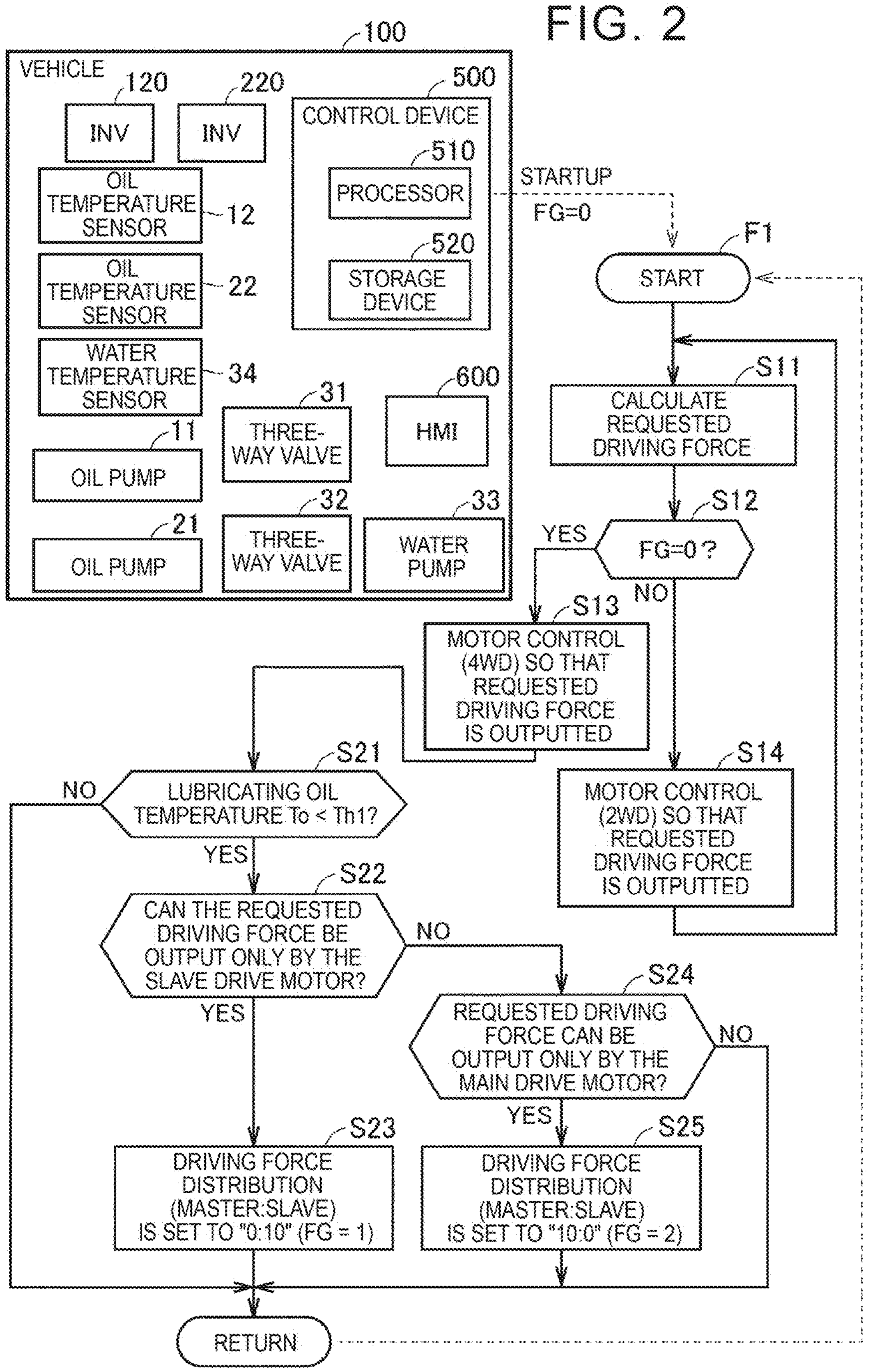
FIG. 2 is a diagram for describing the first motor control according to the present embodiment.

FIG. 2 is a diagram for explaining the first motor control executed by the control device 500. Referring to FIG. 2, the vehicle 100 further includes a human machine interface (HMI) 600. HMI 600 includes, for example, an inputting device and a displaying device. HMI 600 may include an operating unit (e.g., an accelerator pedal, a brake pedal, and a steering wheel) for requesting the user to accelerate, decelerate, and steer the vehicle 100 (the control device 500). The vehicle 100 is also equipped with various sensors (not shown). The in-vehicle sensor may include, for example, a sensor that detects the state of each of the motors 110, 210 and a sensor that detects the input power and the output power of each of the inverters 120, 220.

The control device 500 includes a processor 510 and a storage device 520. The storage device 520 is configured to store stored information. The storage device 520 stores various kinds of information used in the program in addition to the program. In this embodiment, the processor 510 executes a program stored in the storage device 520 to execute, for example, the control described below. However, these controls may be executed only by hardware (electronic circuits) without using software.

The control device 500 executes each process flow illustrated by a flowchart in FIG. 2 and FIG. 3 described later. "S" in the flowchart means step. The storage device 520 stores flag FG used in these processes. The flag FG indicates the driving mode of the vehicle 100. The default of the flag FG is set to "0", for example.

The control device 500 starts a process flow F1 triggered by, for example, activation of a control system (including the control device 500) of the vehicle 100. In S11, the control device 500 calculates a requested driving force requested for the vehicle 100. In the vehicle 100 in manual driving, the control device 500 may calculate the requested driving force based on, for example, the state (vehicle speed, load, and the like) of the vehicle 100 and the driving request (accelerator operation amount, brake operation amount, steering angle, and the like) from the user. Further, the vehicle 100 may be configured to be capable of automatic driving. The vehicle 100 may include a camera and/or a radar for recognizing a surrounding situation. In the autonomous vehicle 100, the control device 500 may calculate the requested driving force based on, for example, the state of the vehicle 100 and the situation around the vehicle 100 (a passer, another vehicle, a road gradient, a road sign, a traffic light, and the like).

In the following S12, the control device 500 determines whether the flag FG is "0". Initially, since the flag FG is "0", it is determined that S12 is YES, and the process proceeds to S13. In S13, the control device 500 drives the motors 110 and 210 to control the inverters 120 and 220 to generate the requested driving force calculated by S11.

Specifically, the control device 500 controls the driving force of the motor 110 and the driving force of the motor 210 so that the sum of the driving forces applied to all the driving wheels (from the wheels W1 to W4) included in the vehicle 100 approaches the requested driving force. At this time, the control device 500 may determine the driving force distribution between the driving force of the motor 110 (main drive motor) and the driving force of the motor 210 (slave drive motor) so that the difference between the temperature of the lubricating oil of the speed reducer 130 and the temperature of the lubricating oil of the speed reducer 230 becomes small. The driving force distribution is represented by, for example, a ratio of the driving force of the motor 110 to the sum of the driving force of the motor 110 and the driving force of the motor 210 (total driving force) (hereinafter, also referred to as "main driving distribution"). The main drive distribution is expressed by an expression such as "main drive distribution=driving force of main drive motor/total driving force". In S13 control, as the main drive distribution increases, the temperature of the lubricating oil of the speed reducer 130 tends to increase, and the temperature of the lubricating oil of the speed reducer 230 tends to decrease. When the temperature of the lubricating oil of the speed reducer 130 is lower than the temperature of the lubricating oil of the speed reducer 230, the temperature difference between the two tends to be small by increasing the main drive distribution. When the temperature of the lubricating oil of the speed reducer 130 is higher than the temperature of the lubricating oil of the speed reducer 230, the temperature difference between the two tends to be small by reducing the main drive distribution. In S13, the main drive distribution is set to be greater than "0" and less than "1". In S13, both motors 110 and 210 are activated and a four-wheel drive (4WD) is performed.

In the following S21, the control device 500 determines whether or not the temperature parameter (hereinafter, referred to as "To") correlated with the temperature of the speed reducer 130 and the temperature of the speed reducer 230 is lower than a predetermined temperature (hereinafter, referred to as "Th1"). The main body of the speed reducer 130 is heat-exchanged with the lubricating oil flowing through the oil circuit P1. Therefore, the temperature of the speed reducer 130 is correlated with the temperature of the lubricating oil of the speed reducer 130. The main body of the speed reducer 230 is heat-exchanged with the lubricating oil flowing through the oil circuit P2. Therefore, the temperature of the speed reducer 230 is correlated with the temperature of the lubricating oil of the speed reducer 230. In this embodiment, the mean value of the temperature (first oil temperature) of the lubricating oil of the speed reducer 130 detected by the temperature sensor 12 and the temperature (second oil temperature) of the lubricating oil of the speed reducer 230 detected by the temperature sensor 22 is defined as To. However, the present disclosure is not limited thereto, and the sum of the first oil temperature and the second oil temperature may be adopted as To. In addition, a lower temperature or a higher temperature among the first oil temperature and the second oil temperature may be adopted as To. Th1 may be set according to properties of the lubricating oil (e.g., viscosity-temperature relation). The viscosity of the lubricating oil of the speed reducer tends to increase as the temperature decreases. If the temperature of the lubricating oil of the speed reducer becomes too low, the loss of the speed reducer tends to increase due to an increase in the viscosity of the lubricating oil. Th1 may be at a point temperature where the viscosity of the lubricating oil is greater than an appropriate range.

If To is lower than Th1 (YES in S21), the control device 500 determines in S22 whether or not the requested driving force is equal to or less than the maximal driving force of the motor 210. When the requested driving force is equal to or less than the maximal driving force of the motor 210 (YES in S22), the process proceeds to S23. In S23, the control device 500 sets the main drive distribution to "0" and sets the flag FG to "1". Setting the main drive distribution to "0" means that the driving force distribution (master:slave) becomes "0:10". The control device 500 stops the motor 110 in accordance with the main drive distribution, and generates a requested driving force by the motor 210. As a result, the drive system is changed from 4WD to two-wheel drive (2WD). When the requested driving force is equal to or less than the maximum driving force of the motor 210, it means that the requested driving force can be output only by the motor 210.

When the requested driving force is larger than the maximum driving force of the motor 210 (NO in S22), the control device 500 determines whether or not the requested driving force is equal to or less than the maximum driving force of the motor 110 in S24. When the requested driving force is equal to or less than the maximal driving force of the motor 110 (YES in S24), the process proceeds to S25. In S25, the control device 500 sets the main drive distribution to "1" and sets the flag FG to "2". Setting the main driving distribution to "1" means that the driving force distribution (master:slave) becomes "10:0". The control device 500 stops the motor 210 in accordance with the main drive distribution, and generates a requested driving force by the motor 110. As a result, the driving method is changed from 4WD to 2WD.

When S23 or S25 process is executed, the process returns to the first step (S11). In this instance, since the flag FG is "1" or "2", it is determined as NO in S12, and the process proceeds to S14. In S14, the control device 500 controls the inverters 120, 220 so as to generate the requested driving force calculated by S11 by the motor (one of the motors 110, 210) in operation. A two-wheel drive (2WD) is executed by the motor in operation. The motor in operation is the motor 210 when the flag FG is "1", and the motor 110 when the flag FG is "2". Thereafter, the process returns to S11. S11, S12, S14 are repeated while the flag FG is not "0".

If To is greater than or equal to Th1 (NO in S21), the process returns to S11. Also, when the requested driving force is larger than the largest driving force of the motor 110 (NO in S24), the process returns to S11. However, in these cases, the flag FG is set to "0". Therefore, S12 determines YES, and the above-described S13 process is executed. While the flag FG is "0", S13 process is repeatedly executed from S11.

Figure 3:
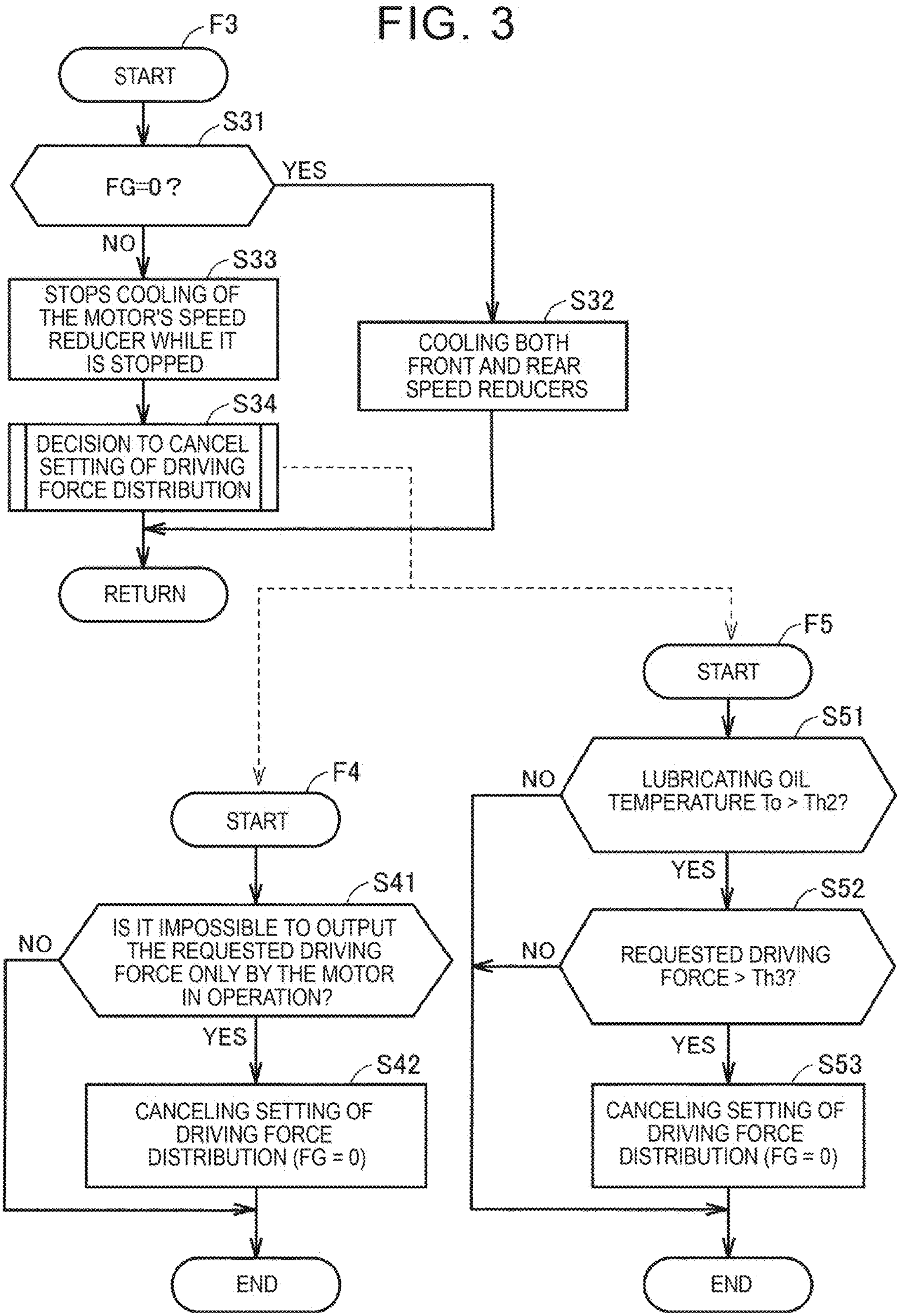
FIG. 3 is a diagram for describing a second motor control according to the present embodiment.

The control device 500 executes the process flow F3 illustrated in FIG. 3 in parallel with the process flow F1 illustrated in FIG. 2. For example, when the control system of the vehicle 100 is activated, the process flow F3 is started together with the process flow F1. FIG. 3 is a diagram for explaining the second motor control executed by the control device 500.

Referring to FIG. 3, in S31, the control device 500 determines whether the flag FG is "0". Initially, since the flag FG is "0", it is determined that S31 is YES, and the process proceeds to S32. When the flag FG is "0", both motors 110 and 210 are activated (see S13 in FIG. 2). In S32, the control device 500 controls the cooling device 30 illustrated in FIG. 1 so that each of the lubricating oil of the speed reducer 130 mechanically connected to the motor 110 and the lubricating oil of the speed reducer 230 mechanically connected to the motor 210 is cooled. In S32, all of the pumps 11, 21, 33 are activated.

Specifically, the control device 500 controls the three-way valves 31 and 32 so that the passage P31 and the passage P32 are connected and the passage P33 and the passage P34 are connected. Then, the control device 500 controls the pump 33 so that the refrigerant (coolant) flows through the passages P31, P32, P33, P34, P35 in this manner. The heat exchanger 41 exchanges heat between the lubricating oil of the speed reducer 130 flowing through the oil circuit P1 and the refrigerant (coolant) flowing through the passage P34. The lubricating oil of the speed reducer 130 is cooled by this heat exchange. In addition, the heat exchanger 42 exchanges heat between the lubricating oil of the speed reducer 230 flowing through the oil circuit P2 and the refrigerant (coolant) flowing through the passage P32. The lubricating oil of the speed reducer 230 is cooled by this heat exchange. When S32 process is executed, the process returns to the first step (S31). While the flag FG is "0", the cooling (S32) of the lubricating oils of the respective speed reducers by the cooling device 30 is continuously performed.

In the process flow F1 (FIG. 2) executed in parallel with the process flow F3, when the flag FG is not "0" by executing the process of S23 or S25, it is determined that S31 is NO, and the process proceeds to S33. When the flag FG is not "0", one of the motors 110 and 210 is in the stopped state and the other is in the activated state. In S33, the control device 500 controls the cooling device 30 shown in FIG. 1 so that the lubricating oil of the speed reducer 130 or 230 mechanically connected to the motor in operation is cooled and the lubricating oil of the speed reducer 230 or 130 mechanically connected to the motor in operation is not cooled. Specifically, the cooling control described below is executed. As a result, the temperature of the lubricating oil of the speed reducer mechanically connected to the motor during operation is suppressed from being excessively increased, and the temperature of the lubricating oil of the speed reducer mechanically connected to the motor during stoppage is easily increased. According to such a configuration, the heat management of each of the front portion and the rear portion of the vehicle 100 is easily performed appropriately.

For example, when the flag FG is "1", the motor 210 (slave drive motor) is in an operating state and the motor 110 (main drive motor) is in a stopped state. Here, the control device 500 controls the three-way valves 31 and 32 so that the passage P31 and the passage P32 are connected to each other and the passage P33 and the passage P34*a* are connected to each other in S33. In this state, the control device 500 drives the pump 33. In this case, the refrigerant (coolant) passes through the heat exchanger 42, but not through the heat exchanger 41. The lubricating oil of the speed reducer 230 is cooled by heat exchange in the heat exchanger 42. On the other hand, the lubricating oil of the speed reducer 130 is not cooled by the refrigerant (coolant). Further, the control device 500 stops the pump 11. Thus, power consumption is reduced.

When the flag FG is "2", the motor 110 (main drive motor) is in an operating state and the motor 210 (slave drive motor) is in a stopped state. Here, the control device 500 controls the three-way valves 31 and 32 so that the passage P31 and the passage P32*a* are connected to each other and the passage P33 and the passage P34 are connected to each other in S33. In this state, the control device 500 drives the pump 33. In this case, the refrigerant (coolant) passes through the heat exchanger 41 but does not pass through the heat exchanger 42. The lubricating oil of the speed reducer 130 is cooled by heat exchange in the heat exchanger 41. On the other hand, the lubricating oil of the speed reducer 230 is not cooled by the refrigerant (coolant). Further, the control device 500 stops the pump 21. Thus, power consumption is reduced.

When the flag FG is not "0", the control device 500 executes the above-described S33. Subsequently, in S34, the control device 500 determines whether to release the setting of the driving force distribution (a condition in which the main driving distribution is set to "0" or "1"). Specifically, the control device 500 executes the process flows F4, F5 in parallel in S34.

In the process flow F4, the control device 500 determines, in S41, whether the most recent requested driving force calculated in S11 of FIG. 2 is greater than the largest driving force of the motor in operation. When the requested driving force is larger than the maximum driving force of the motor in operation (YES in S41), the control device 500 sets the flag FG to "0" in S42. As a result, the setting of the driving force distribution is canceled, and S12 of FIG. 2 determines that the driving force distribution is YES. S13 then activates both motors 110 and 210. When the requested driving force exceeds the maximum driving force of the motor in operation, it means that the requested driving force cannot be output only by the motor in operation.

When S42 process is executed, the process flow F4 ends. When the requested driving force does not exceed the maximum driving force of the motor in operation (NO in S41), S42 process is not executed. In this instance, the process flow F4 ends while the flag FG remains "1" or "2".

In the process flow F5, the control device 500 determines whether or not the above-described To is higher than a predetermined temperature (hereinafter, referred to as "Th2") in S51. Th2 may be at the same temperature as Th1 or at a higher temperature than Th1. When the flag FG is "1" or "2", the requested driving force is generated by only one motor (S14 in FIG. 2). As a result, the motor in operation is more likely to generate heat than when the requested driving force is generated by the two motors, and the temperature of the speed reducer mechanically connected to the motor in operation is more likely to increase. In addition, since the motor being stopped and the coolant path for cooling the speed reducer are shut off (see S33), the temperature of the speed reducer mechanically connected to the motor being stopped is also likely to increase. Therefore, To increases. If To is higher than Th2 (YES at S51), the process proceeds to S52.

In S52, the control device 500 determines whether or not the most recent requested driving force calculated by S11 of FIG. 2 is larger than a predetermined value (hereinafter, referred to as "Th3"). Th3 is less than the maximal driving force of the motor 210. Th3 may be a threshold at which the requested driving force is greater than the recommended range of 2WD. When the requested driving force is larger than Th3 (YES in S52), the control device 500 sets the flag FG to "0" in S53. As a result, the setting of the driving force distribution is canceled, and S12 of FIG. 2 determines that the driving force distribution is YES. S13 then activates both motors 110 and 210. When S53 process is executed, the process flow F5 ends.

When it is determined that S51 or S52 is NO, S53 process is not executed, and the process flow F5 ends. In S34, when both the process flow F4 and F5 are executed, the process returns to S31. In this way, the process flow F3 is repeatedly executed.

As described above, the motor control methods according to this embodiment include the processes of the process flows F1, F3, F4, F5. When the temperature parameter (To) correlated with the temperature of the speed reducer 130 (first speed reducer) and the temperature of the speed reducer 230 (second speed reducer) is lower than the predetermined temperature, the control device 500 preferentially drives the motor 210 (second motor) relative to the motor 110 (first motor) (S25 from S21 of FIG. 2). When To becomes low, it is estimated that the speed reducer 130,230 temperature is low. In such a case, the temperature of the speed reducer 230 can be increased by preferentially driving the motor 210 over the motor 110. The control device 500 acquires To using the detected data of each of the temperature sensors 12 and 22. According to such a configuration, it is easy to control the lubricating oil of the speed reducer to an appropriate temperature. As described above, by suppressing the temperature of the speed reducer (for example, the temperature of the lubricating oil) from becoming too low, it is possible to suppress an increase in loss. Moreover, it is better to drive the motor 210 having a smaller maximum driving force than to drive the motor 110 having a larger maximum driving force (efficiency of converting electric power into heat). Further, since the loss of the motor 210 tends to be smaller than that of the motor 110, it is better to drive the motor 210 than to drive the motor 110. According to the above configuration, it is possible to warm up at an early stage without using additional energy. Therefore, the energy efficiency of the vehicle 100 including the plurality of motors can be improved.

The control device 500 determines whether or not the predetermined first condition is satisfied when the motor 110 and the motor 210 generate the requested driving force requested for the vehicle 100 (S21, S22 in FIG. 2). The first condition is satisfied when the temperature parameter (To) is lower than the predetermined temperature (Th1) and the requested driving force is equal to or lower than the maximal driving force of the motor 210. When it is determined that the first condition is satisfied (YES in both S21 and S22), the control device 500 stops the motor 110 and generates a requested driving force by the motor 210 (S23 in FIG. 2). By stopping the motor 110, power consumption can be reduced. Further, if the requested driving force is equal to or less than the maximum driving force of the motor 210, it is considered that even if the motor 110 is stopped, there is no trouble in running. According to the above configuration, it is possible to suppress an increase in loss caused by an excessive decrease in the temperature of the speed reducer while suppressing a trouble in driving of the vehicle.

When it is determined that the first condition is not satisfied (NO in S22 of FIG. 2), the control device 500 determines whether or not a predetermined second condition is satisfied (S24 of FIG. 2). The second condition is satisfied when the temperature parameter (To) is lower than the predetermined temperature (Th1) and the requested driving force is greater than the maximum driving force of the motor 210 and is equal to or less than the maximum driving force of the motor 110. When it is determined that the second condition is satisfied (YES in S21, NO in S22, and YES in S24), the control device 500 stops the motor 210 and causes the motor 110 to generate the requested driving force (S25 in FIG. 2). As described above, by stopping the motor 210 and driving the motor 110, the temperature of the speed reducer 130 can be increased. As a result, the temperature of the speed reducer is suppressed from becoming excessively low, and an increase in loss is suppressed. Further, power consumption can be reduced by stopping the motor 210. Further, if the requested driving force is equal to or less than the maximum driving force of the motor 110, it is considered that even if the motor 210 is stopped, the operation of the vehicle 100 is not hindered.

When one of the motors 110 and 210 is in the stopped state and the other is in the activated state, the control device 500 determines whether or not a predetermined third condition is satisfied (S34 in FIG. 3). The third condition is satisfied when the requested driving force requested for the vehicle 100 exceeds the maximum driving force that the motor in operation outputtable. If it is determined that the third condition is satisfied (YES in S41), the control device 500 brings both the motors 110 and 210 into an operating state (S42). In such a configuration, if only one of the motors 110,210 is unable to meet the requested driving force, then both of the motors 110 and 210 are activated. Therefore, it is possible to prevent a trouble in driving of the vehicle 100 due to the stoppage of one of the motors 110, 210.

Figure 4:
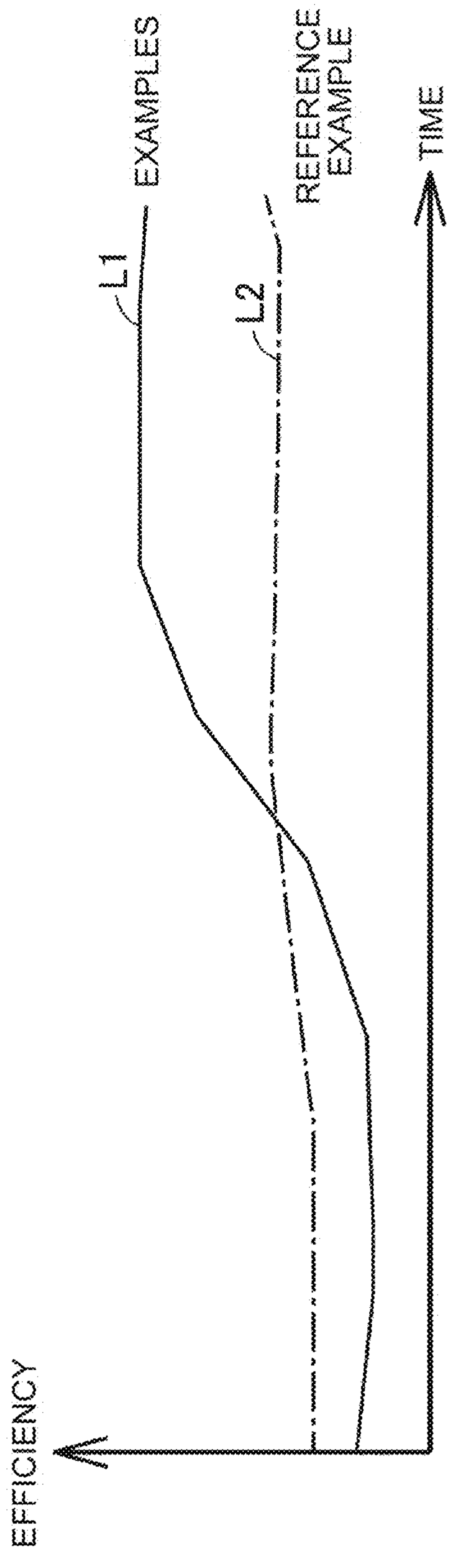
FIG. 4 is a diagram for explaining an operation and an effect produced by the vehicle according to the present embodiment in comparison with a reference example.

FIG. 4 is a diagram for explaining an operation and an effect performed by the vehicle 100 according to the embodiment in comparison with a reference example. In FIG. 4, a line L1 indicates data of the vehicle 100 according to this embodiment, and a line L2 indicates data of the vehicle according to a reference embodiment. The vehicle according to the reference example controls the distribution of the driving force of the main drive motor and the slave drive motor so as to maximize the efficiency at that time without considering the temperature of the speed reducer (i.e., without performing heat management on the speed reducer). According to such control, for example, as shown by a line L2 in FIG. 4, the efficiency is changed. On the other hand, in the vehicle 100 (embodiment), the above-described control (see FIGS. 2 and 3) causes the efficiency to change as indicated by, for example, a line L1. In the short term, the line L1 is higher than the line L2, but in the long term, the line L1 is higher than the line L2. In the long-distance traveling, the electric power cost of the vehicle of the embodiment is higher than that of the vehicle of the reference example.

Note that the configuration of the vehicle is not limited to the configuration shown in FIG. 1. For example, the means for shutting off the coolant channel is not limited to the three-way valve, and can be changed as appropriate. The number of valves is also optional. For example, the number of valves may be reduced by using a five-way valve, a six-way valve, an eight-way valve, a nine-way valve, or a ten-way valve.

Figure 5:
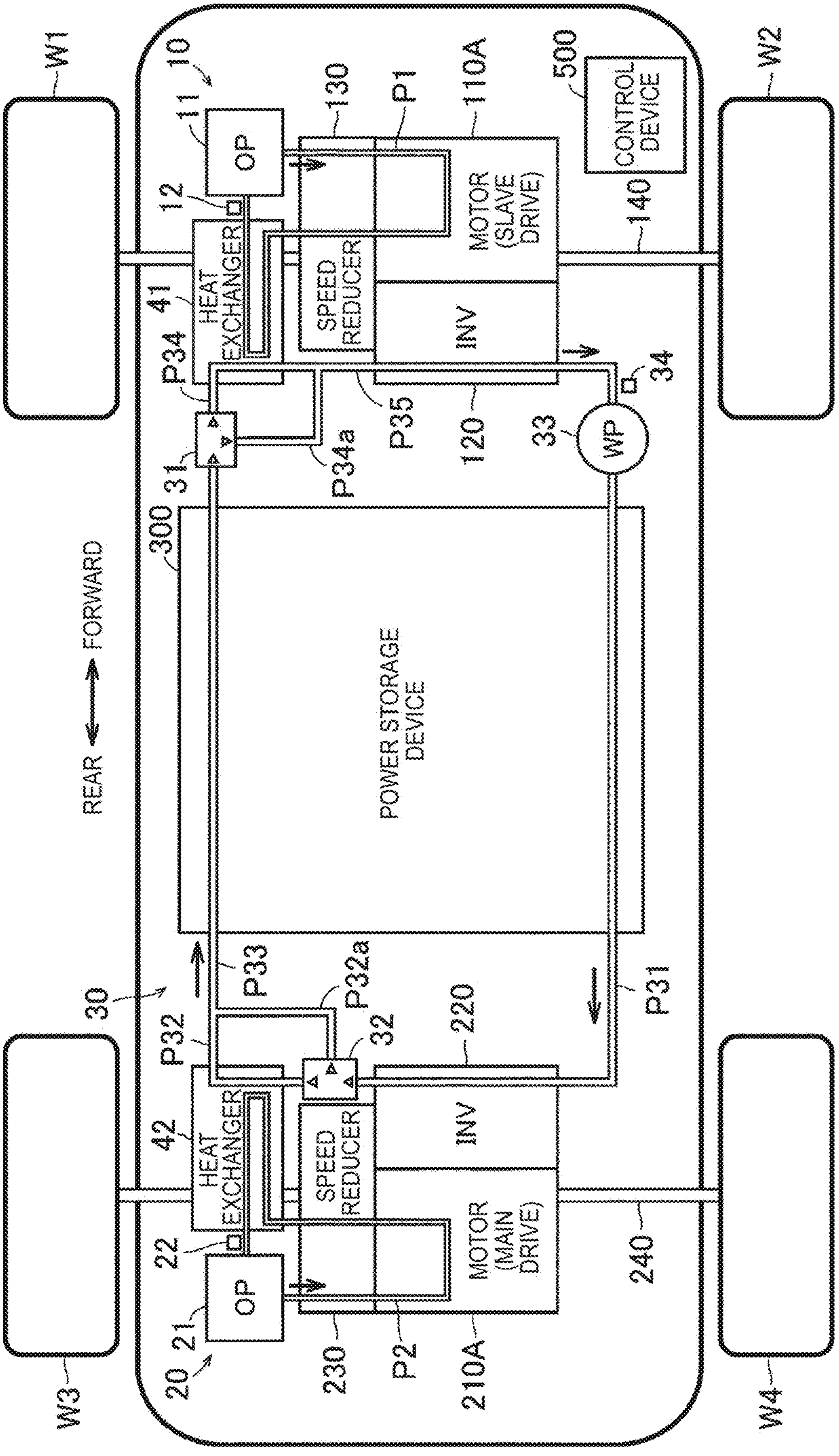
FIG. 5 is a diagram showing a first modification of the configuration of the vehicle shown in FIG. 1.

In the configuration of FIG. 1, the front motor (motor 110) is a main drive motor and the rear motor (motor 210) is a slave drive motor, but the configuration is not limited to such a configuration. FIG. 5 is a diagram illustrating a first modification of the configuration illustrated in FIG. 1. As shown in FIG. 5, the front motor (motor 110A) may be a slave drive motor, and the rear motor (motor 210A) may be a main drive motor. The maximum driving force of the motor 210A is greater than the maximum driving force of the motor 110A.

Figure 6:
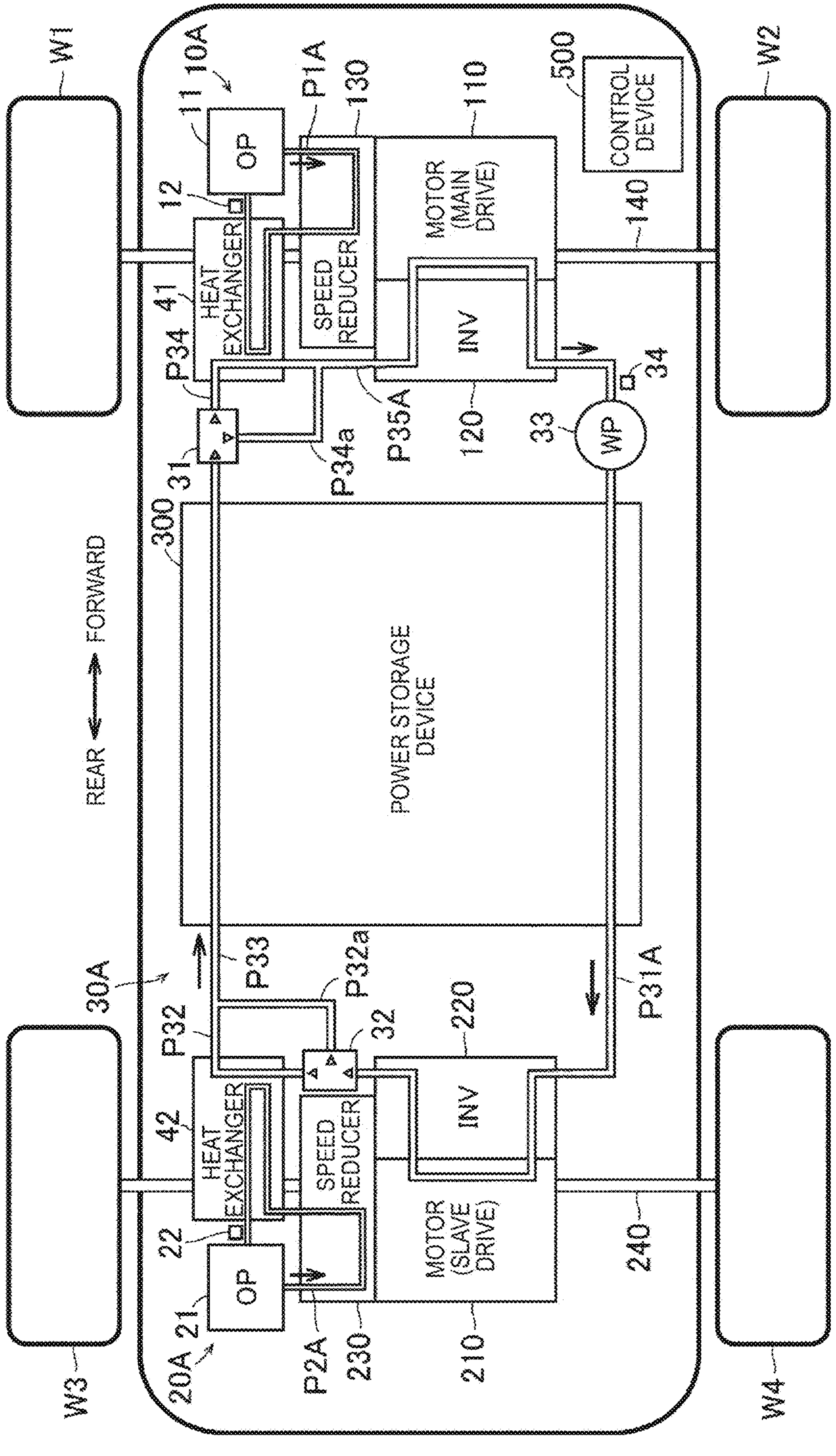
FIG. 6 is a diagram illustrating a second modification of the configuration of the vehicle illustrated in FIG. 1.

In the configuration of FIG. 1, not only the speed reducers 130, 230 but also the motors 110, 210 are cooled by the lubricating oil supplied from the lubricating devices 10 and 20. However, the present disclosure is not limited thereto, and the motors 110, 210 may be cooled by water. FIG. 6 is a diagram illustrating a second modification of the configuration illustrated in FIG. 1. In the configuration shown in FIG. 6, the lubricating devices 10A, 20A supply the lubricating oil to the speed reducers 130, 230 through the oil circuits PIA, P2A, but do not supply the lubricating oil to the motors 110, 210. The passages P35A, P31A constituting the coolant channels pass through the motors 110, 210 and the inverters 120, 220, respectively. The cooling device 30A cools the motors 110, 210, the inverters 120, 220, and the power storage device 300.

The vehicle may comprise more than three motors. The vehicle may comprise a plurality of in-wheel motors. The vehicles may be electrified vehicle (xEV other than BEV). The number of wheels is also arbitrary, and may be two, three or five or more wheels.

The process flows F1, F3, F4, F5 shown in FIGS. 2 and 3 can be changed as appropriate. For example, in the process flow F5 illustrated in FIG. 3, S52 may be omitted. Th2 may be variable depending on the requested driving force. Further, in the above-described embodiment, as the motor control for preferentially driving the second motor over the first motor, a motor control for stopping the first motor when there is no trouble in the operation of the vehicle even if both the first motor and the second motor are stopped is adopted. However, the present disclosure is not limited thereto, and a motor control in which the driving force distribution between the driving force of the first motor and the driving force of the second motor is biased toward the second motor side may be adopted as the motor control for preferentially driving the second motor rather than the first motor. For example, the process flow F1 shown in FIG. 2 may be modified such that the main drive distribution is set to be greater than 0.0 and less than or equal to 0.3 in S23.

The embodiment disclosed herein should be considered as illustrative and not restrictive in all respects. The scope of the present disclosure is shown by the claims rather than the above embodiment, and is intended to include all modifications within the meaning and the scope equivalent to those of the claims.

What is claimed is:

1. A vehicle, comprising:

a first motor configured to apply driving force to a first wheel via a first speed reducer;

a second motor configured to apply driving force to a second wheel via a second speed reducer; and a control device configured to control the driving force of the first motor and the driving force of the second motor, wherein a maximum driving force of the first motor is greater than a maximum driving force of the second motor, drive the second motor with priority over the first motor in a case where a temperature parameter correlated with a temperature of the first speed reducer and a temperature of the second speed reducer is lower than a predetermined temperature, determine whether a first condition is satisfied in a case where requested driving force requested to the vehicle is generated by the first motor and the second motor, wherein the first condition is satisfied in a case where the temperature parameter is lower than the predetermined temperature, and the requested driving force is no greater than the maximum driving force of the second motor, stop the first motor and generate the requested driving force by the second motor in a case where a determination is made that the first condition is satisfied, determine whether a second condition is satisfied in a case where a determination is made that the first condition is not satisfied, wherein the second condition is satisfied in a case where the temperature parameter is lower than the predetermined temperature, and the requested driving force is greater than the maximum driving force of the second motor and no greater than the maximum driving force of the first motor, stop the second motor and generate the requested driving force by the first motor in a case where a determination is made that the second condition is satisfied, and in a case where the second motor is driven with priority over the first motor and the first motor is in a stopped state, determine whether the temperature parameter is higher than a second predetermined temperature and whether the requested driving force is larger than a predetermined value that is less than the maximum driving force of the second motor, and place both the first motor and the second motor in a running state in a case where determinations are made that the temperature parameter is higher than the second predetermined temperature and that the requested driving force is larger than the predetermined value.

2. The vehicle according to claim 1, wherein:

the control device is configured to determine whether a third condition is satisfied in a case where one of the first motor and the second motor is in a stopped state and the other is in a running state, and place both the first motor and the second motor in a running state in a case where a determination is made that the third condition is satisfied; and the third condition is satisfied in a case where the requested driving force requested to the vehicle exceeds the maximum driving force of the motor that is currently running.

3. The vehicle according to claim 1, wherein:

out of the first wheel and the second wheel, one is a front wheel of the vehicle, and the other is a rear wheel of the vehicle;

the vehicle further includes a first oil circuit through which lubricating oil of the first speed reducer circulates, a second oil circuit through which lubricating oil of the second speed reducer circulates, a first temperature sensor that detects a temperature of the lubricating oil of the first speed reducer, a second temperature sensor that detects a temperature of the lubricating oil of the second speed reducer, and a cooling device that cools the lubricating oil of the first speed reducer and the lubricating oil of the second speed reducer;

the control device is configured to acquire the temperature parameter using a detection result from the first temperature sensor and a detection result from the second temperature sensor; and while, out of the first motor and the second motor, one is in a stopped state and the other is in a running state, control the cooling device such that the lubricating oil of the first speed reducer or the second speed reducer mechanically connected to the motor that is currently running is cooled by the cooling device, and the lubricating oil of the second speed reducer or the first speed reducer mechanically connected to the motor that is currently stopped is not cooled by the cooling device.

4. The vehicle according to claim 1, wherein:

sensitivity of a loss to rotational speed is smaller for the second motor than for the first motor; and the control device is configured to drive the second motor with priority over the first motor in a case where the temperature parameter correlated with the temperature of the first speed reducer and the temperature of the second speed reducer is lower than the predetermined temperature at which energy loss increases due to a rise in viscosity of lubricating oil in the first and second speed reducers.

* * * * *